United States Patent [19]

Ives

[11] Patent Number: 4,903,750
[45] Date of Patent: Feb. 27, 1990

[54] CONTINUOUS CASTER ROLL MONITOR

[75] Inventor: Kenneth D. Ives, Valparaiso, Ind.

[73] Assignee: Westinghouse Electric Corp., Pittsburgh, Pa.

[21] Appl. No.: 238,379

[22] Filed: Aug. 31, 1988

[51] Int. Cl.[4] .............................................. B22D 11/16
[52] U.S. Cl. ..................................... 164/150; 164/4.1; 33/657; 33/710
[58] Field of Search ................. 164/4.1, 150, 154, 451, 164/452; 33/178 E, 143 R, 144, 657, 783, 809, 827, 501.2, 501.3, 178 F

[56] References Cited

U.S. PATENT DOCUMENTS 3,939,568  2/1976  Gonos et al. ........................ 33/178 F

FOREIGN PATENT DOCUMENTS 62-161447  7/1987  Japan .................................... 164/451

Primary Examiner—Kuang Y. Lin
Attorney, Agent, or Firm—M. J. Moran

[57] ABSTRACT

A gap monitor for rolls of a continuous casting machine characterized by sets of rolls disposed in opposed pairs separated by spaced gaps and defining a path of travel for a workpiece, each roll comprising aligned roll segments, a roll gap monitor including a housing having one side retractably movable from the housing to contact rolls so that the other side of the housing also contacts the corresponding rolls. The one side is coextensive with the housing and is spring biased outwardly to contact the aligned roll segments. The monitor also comprises a gap sensor extending between opposite sides of the housing and having opposite ends engageable with the opposite pairs of rolls successively as the monitor moves through the path of travel. Transducer means are operatively connected to the gap sensor for transmitting signals representative of measurements of the gaps of each pair of rolls.

6 Claims, 5 Drawing Sheets

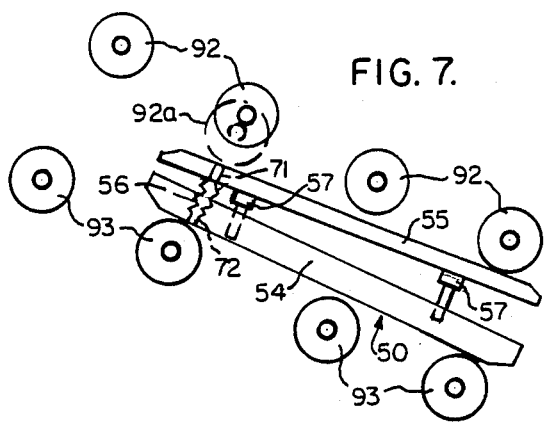
FIG. 7.
FIG. 1.

CONTINUOUS CASTER ROLL MONITOR

BACKGROUND OF THE INVENTION

1. Field of the Invention

This invention relates to a continuous casting machine for metals and, more particularly, it pertains to improved apparatus for monitoring and sensing positions of rolls which provide a path of travel for a continuously cast strand of metal as it solidifies.

2. Description of the Prior Art

A conventional continuous casting machine is characterized by a liquid metal continuously poured into a water cooled open-ended mold from which a partially solidified middle strand issues and moves between a series of spaced rolls which engage opposite surfaces of the strand. The series of spaced rolls form a path of travel for the strand which generally extends vertically from the mold and then turns to a horizontal direction.

Heretofore each roll has been a single structure coextensive with the width of the metal strand the opposite ends of which roll are journally mounted. With repeated use of the casting machine the rolls gradually deviate from their original positions due to such conditions as bending, wear of the roll surface, and deterioration of the journal mounting. For this reason, it has been desirable to periodically monitor the condition of the rolls to determine the necessity of replacement. For that purpose, a so-called "sled" has been used for testing the gap between pairs of rolls, such as disclosed in U.S. Pat. No. 3,939,568, issued Feb. 24, 1976, entitled "Method and Apparatus for Locating Improperly Positioned or Bent Rolls" of which the inventors are Michael G. Gonos, Kenneth D. Ives, and Ronald S. Vranka. All previous roll gap measuring sleds use runners to apply loads to a position the road gap measuring sled in a cast line. Some of the runners apply a load of sufficient magnitude to lift the caster containment rolls to reduce or eliminate any bearing clearances that affect the accuracy of the measurement.

As the state of the art of continuous casing procedures has developed, casting speeds have increased and roll spacing has decreased which conditions have resulted in the replacement of single rolls with segmented rolls. The sleds used for measuring roll gaps between pairs of single rolls of the prior art have not been satisfactory for measuring gaps between pairs of segmented rolls. Segmented rolls are rolls comprised of two or three longitudinal roll sections.

SUMMARY OF THE INVENTION

In accordance with this invention, an improved sled is provided for monitoring gaps between opposed rolls in a continuous casting machine of the type having sets of rolls disposed in opposed pairs separated by space gaps and defining a path of travel for a workpiece, each roll including at least two aligned roll segments, a gap monitor for monitoring the gaps between the opposed pairs of rolls, the monitor comprising a housing movable along the path and having opposite side surfaces with one opposite side surface facing the roll segments on one side of the path of travel and the other opposite side surface being substantially coextensive with the housing and being retractably moveable from the housing toward the other side of the path of travel and against the aligned roll segments, bias means in the housing for moving the other opposite side surface against the aligned roll segments as the housing moves through the path of travel, the gap sensor extending through opposite sides of the housing for measuring the gaps between each opposed pair of roll segments, each gap sensor extending perpendicularly to the direction of path of travel of the housing and including heads mounted for relative movement normal to the direction of travel and simultaneously engageable with the segments of corresponding pairs of rolls successively along the direction of movement, and transducer means operatively connected with the heads for transmitting signals representative of the measurements of the gap of each pair of rolls.

The advantage of the sled device of this invention is that it applies a normally distributed load across the length of the roll of a large enough magnitude to minimize bearing clearances. The entire top half of the sled is spring loaded to apply a load, and the top half is divided it to sections to allow each section to uniformly load each roll segment.

DESCRIPTION OF THE DRAWINGS

FIG. 1 is a diagrammatic elevational view of a continuous casting machine.

FIG. 6 is a diagrammatic elevational view illustrating the gap monitor between opposed pairs of rolls.

DESCRIPTION OF THE PREFERRED EMBODIMENT

Figure 2:
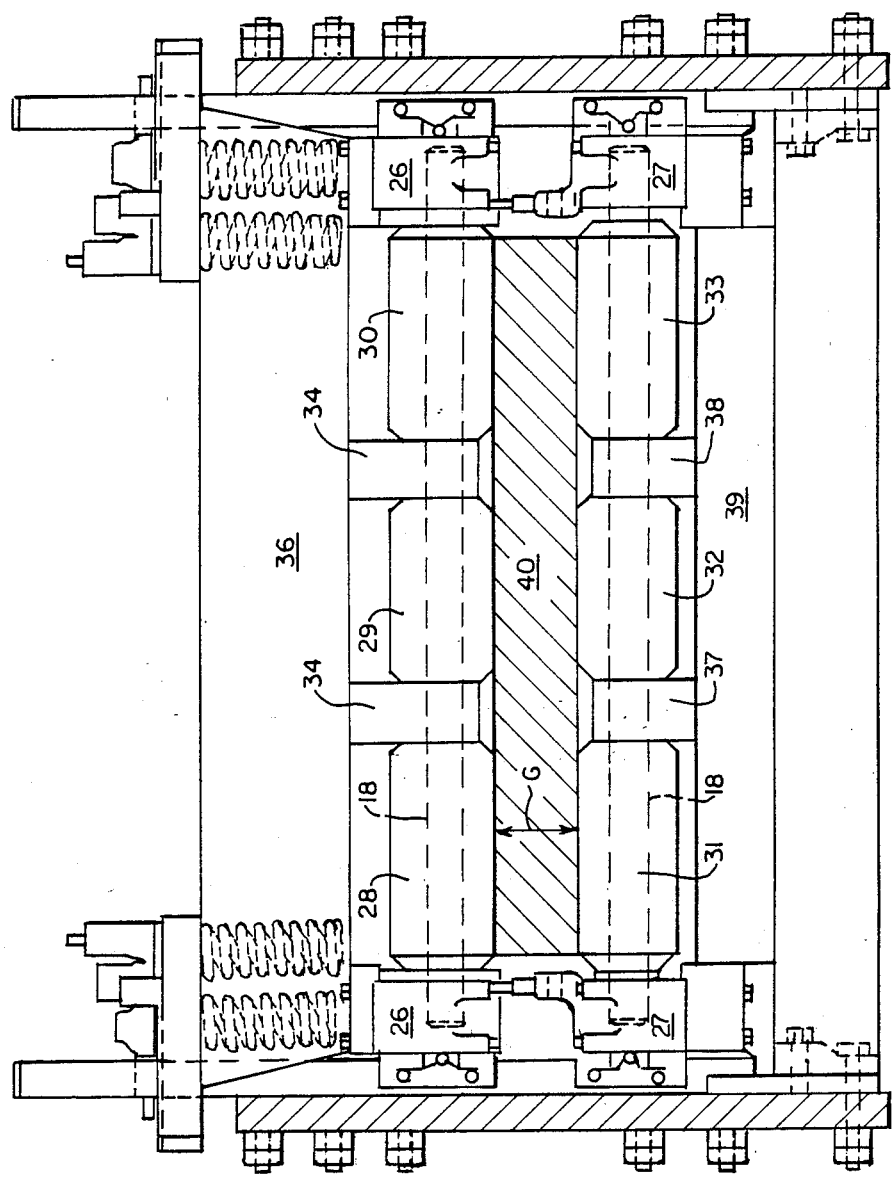
FIG. 2 is an enlarged view of a pair of rolls, taken on the line II—II of FIG. 1.

As shown in FIG. 1 a continuous casting machine is disposed below a molten metal ladle 7 and a tundish 9. The casting machine comprises an open ended, water-cooled, vertically vibrating mold 10, a guide roll rack 12, a bending roll unit 13, a curved roll-rack 14, a straightener 15, and a run-out conveyor 16. Liquid metal (not shown) is teemed from the ladle 7 into the tundish 17 from where it is poured into is the mold 10. A partially solidified casting (not shown) emerges continuously from the bottom of the mold and moves successively through the aforementioned components 12, 13, 14, 15, 16. The continuous casting or strand (not shown) is propelled by speed regulating drive rolls 19, 20 in the straightener and by power driven pinch rolls in auxiliary drives 21, 22, 23, which are located at spaced levels between the guide roll rack 12 and the straightener 15. The drives 21, 22, 23, are reversible and the other interposed rolls are idlers. The foregoing structure is similar to that set forth in U.S. Pat. Nos. 3,735,848, 3,752,210, and 3,939,568. The walls of the bending row unit 13, the curved roll rack 14, and auxiliary drives 21, 22, 23 are arranged in top and bottom clusters 24, 25 of two rolls per cluster. The work-engaging faces of the rolls of the bottom cluster 25 are disposed in an arc. The gap between the working faces of the top and bottom roll pairs is indicated at G.

As shown more particularly in FIG. 2 the rolls are mounted in a frame that includes opposed pairs of similar chocks 26, 27. The upper roll is comprised of a plurality of roll segments 28, 29, 30 and the lower roll is comprised of a similar number of roll segments 31, 32, 33. The upper and lower roll segments are mounted on similar shafts 18 the ends of which are journalled in suitable bearings within the chocks 26, 27. The portions of the shaft 18 between the segments 28, 29, and 29, 30 are reinforced by similar journals 34, which are mounted on a frame member 36. Similarly, the shaft for the lower roll segments 31, 32, 33 are reinforced by journals 37, 38 which are mounted on a frame member 39. The frame members 36, 39 are parts of the rack which include the chocks 26, 27. The upper and lower roll segments are separated by the space or gap G through which a workpiece or strand 40 passes through the casting machine.

Figure 3:
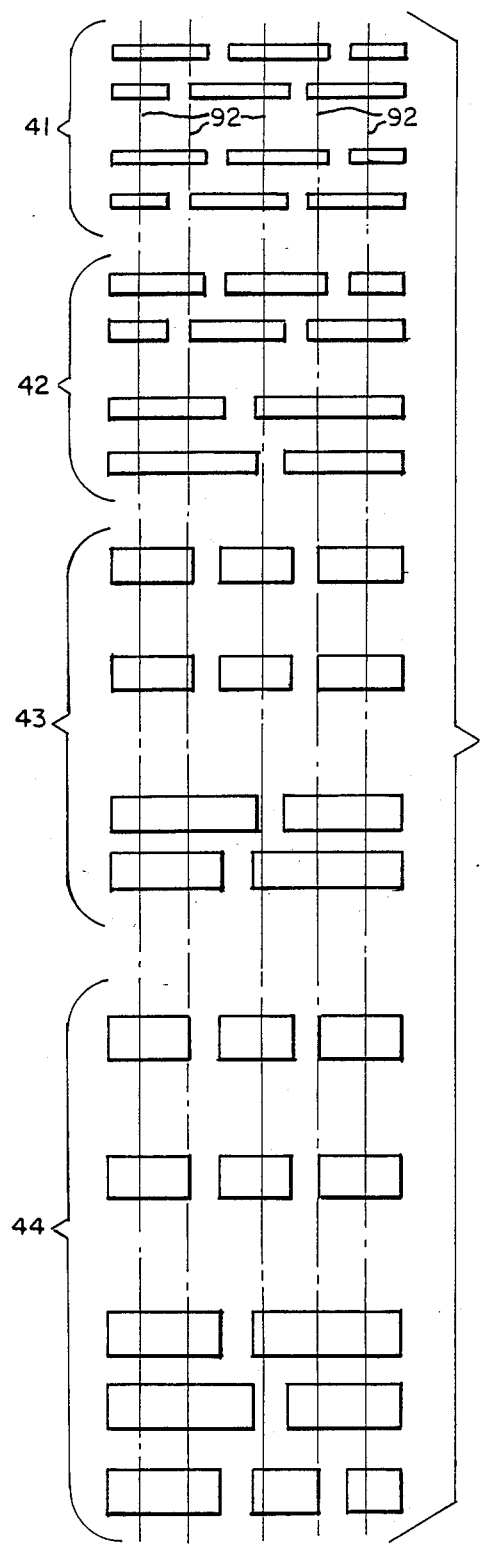
FIG. 3 is a diagrammatic view illustrating the layer in which rolls are disposed for supporting the solidifying workpiece.

As shown in FIG. 3, the rolls are arranged from top to bottom in groups of rolls 41, 42, 43, 44 with increasing diameters. For example, roll group 41, such as in the roll rack 12, has a smaller diameter than roll group 42 of intermediate diameter such as bending roll unit 13. Similarly, the roll group 43, such as in the auxiliary drive 23, has the larger diameter than the group 42 in the array. The reason for the increasing diameter size of the several roll groups 41, 42, 43, 44 is that as the strand or workpiece 40 completes solidification its thickness reduces from the upper to the lower end of the casting machine.

During operation of the casting machine over a period of time, the rolls and bearings wear or become otherwise defective so that the gap G between the upper and lower rolls deviates from their original dimension and positions. For that reason, it is necessary from time to time to monitor the gap G to determine whether or not a deviation from the preset conditions requires adjustment or replacement of the any roll rack.

Figures 4, 6:
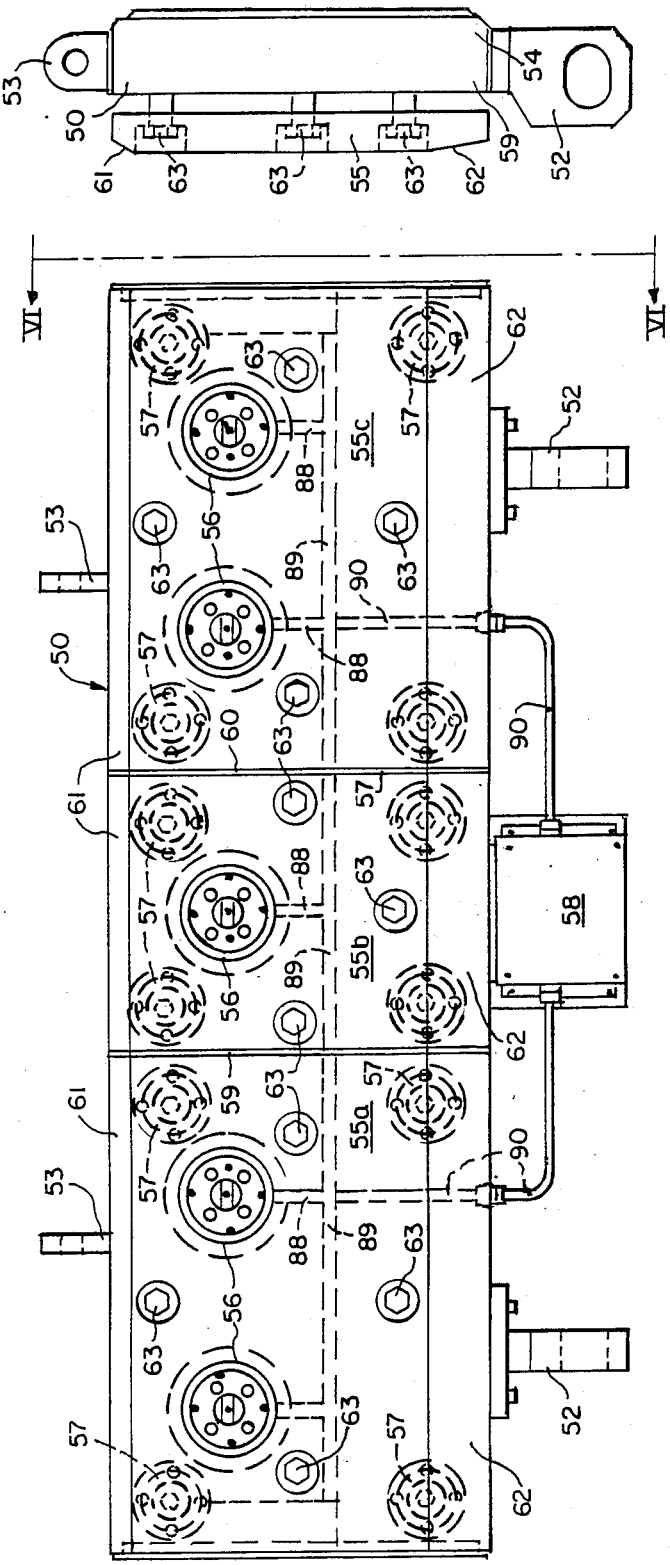
FIG. 4 is a plan view of a device of this invention.
FIG. 6 is a side view, taken on the line VI—VI of FIG. 4.

A roll gap monitor 50 (FIG. 1) is provided for movement between the spaced rolls forming the path of travel for the workpiece or strand 40 (FIG. 2). The monitor 50 is detachably mounted on the end of a flexible starter bar 51 by which the monitor is moved from the upper end of the casting machine to the lower end in order to monitor and measure the space or gap between pairs of rolls. For that purpose the monitor 50 includes connecting eyes 52 (FIGS. 4, 6) by which the monitor 50 is connected to corresponding eyes on the end of the starter bar 51. The monitor also includes lifting eyes 53 by which the monitor may be lifted by suitable means, such as a cable, when desirable.

In accordance with this invention, the monitor 50 (FIGS. 4-7) is comprised of a housing 54, a shoe 55, a plurality of gap sensors 56, a plurality of bias member 57, and a junction box 58. The housing 54 generally is a rectangular parallel epiped and is comprised of a metal, such as steel.

The shoe 55 is movably mounted on the housing 54 and is substantially coextensive with the top side of the housing. More particularly, the shoe is divided into a plurality, such as three sections 55A, 55B, 55C, which are separated from each other at locations 59 and 60. Leading edges 61 of the shoe sections are beveled and rear edges 62 are likewise beveled. The beveled edges 61, 62 facilitate movement of the monitor through the gap G. The several sections of the shoe 55 are retained in place on the housing 54 by a plurality of retaining bolts 63 which are contained (FIG. 5) within recesses 64 of the shoe. The shaft of each bolt 63 extends through a pair of aligned holes in the shoe and the housing 54 and the bolts are secured in place by nuts 65.

Figure 5:
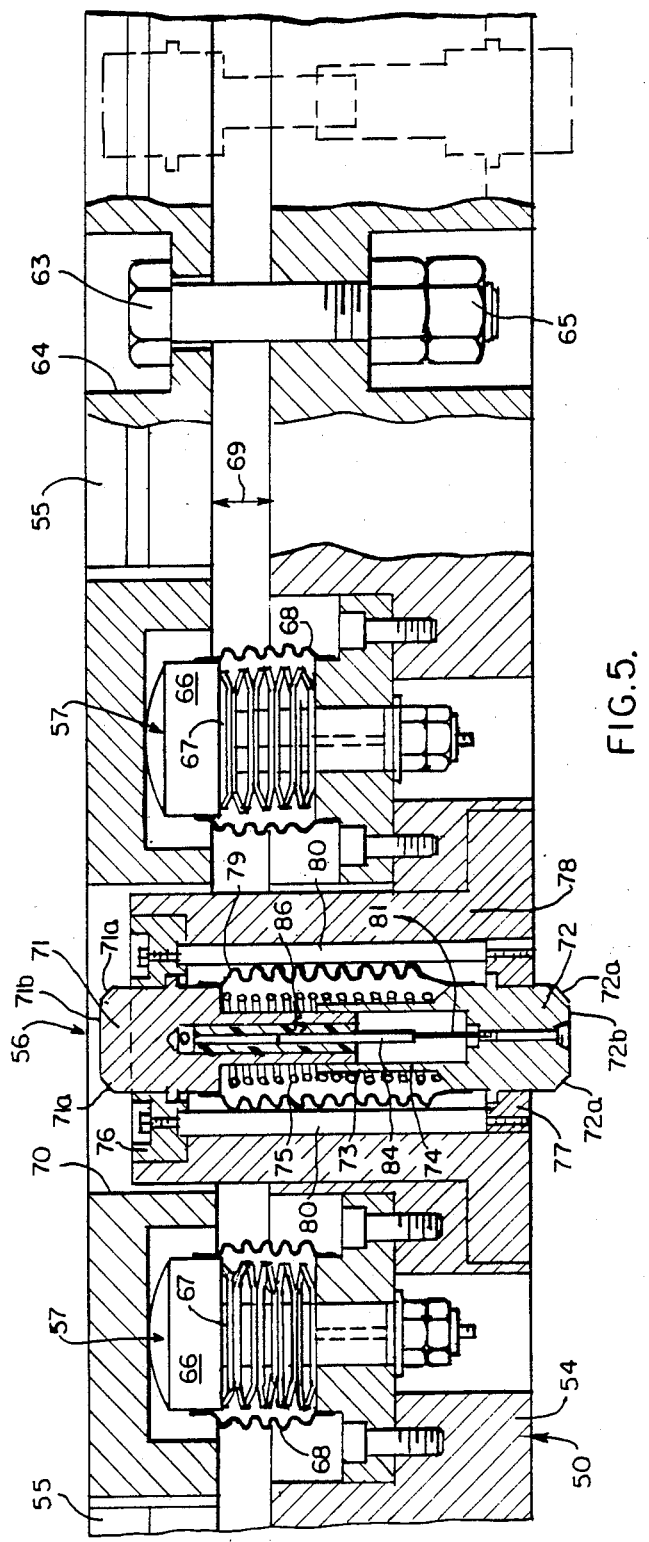
FIG. 5 is a fragmentary elevational view, partly in section, taken in line V—V of FIG. 4.

Bias members or means 57 are disposed at the four corner portions of each section of the shoe 55 and are comprised of a bolt 66 and spring 67, such as a coil or Belleville spring (FIG. 5). Bellows 68 enclose the assembly of the bolt and spring. Each bias member 57 is mounted in a recess in housing 54 and the bolts 66 are urged outwardly by the springs 67 against the shoes 55 so as to hold the shoe 55 and the housing at a distance indicated by the space 69. The retaining bolts 63 hold the shoe section 55 in place. Accordingly, though the bias members 57 yieldingly retain the shoe sections against the heads of the bolts 63, the springs 67 yield to enable the shoe to move inwardly toward the body of the housing 54.

The gap sensor 56 is fixedly mounted in the housing 54 and extends through and within an opening 70 in the shoe 55. The sensor comprises a pair of sensing heads 71, 72 which are integral portions of telescopically fitting tubes 73, 74. A coil spring 75 retains the heads 71, 72 in extended positions within a retaining unit including opposite end walls 76, 77 of a tubular housing 78. The assembly of a spring 75 and telescopic tubes 73, 74 is contained within bellows 79. The end walls 76, 77 are secured in place within the ends of the housing 78 by a plurality of the bolts 80 extending between the end walls. The gap sensor 56 is available commercially from Bournes, Inc., Riverside, Calif., under the designation "D.C. Ser. No. 0773-113", or a DC-DC linear variable differential transducer available from Pickering Co. Inc., Plainsville, N.Y. The sensing heads 71, 72 are beveled at 71a, 72a respectively, in the direction of travel through the caster containment to properly engage rolls at the topmost surface 71b and bottommost surface 72b to accommodate for misalignment or bent rolls. However, the surfaces 71b and 72b are sufficiently wide to contact the split roll sections or segments.

When the sled 50 moves between an opposite pair of rolls, the head 72 (FIG. 5) is compressed against the coil spring 75, causing the tubes 73, 74 to compress together telescopically. A rod 81 which is mounted at the lower end of the head 72 moves upwardly, whereby a core 84 on the upper end of the rod moves further into a coil 86. Lead wires (not shown) extend from the coil through innerconnecting passages 88, 89, 90 to the electrical recorder or junction box 58 which houses a memory unit (or other data collection or transmission device) for recording or monitoring the movement of the head 72. Similarly, when the shoe 55 is depressed through the space 69 (FIG. 5), the upper head 71 is compressed either alone or simultaneously with the head 72 causing the core 84 to move further into the coil 86 resulting in similar results as described with respect to the head 72.

Accordingly, as the roll gap monitor or sled 50 moves through the caster, spacings between the rolls which are greater or lesser than the prescribed settings there between are sensed. The resulting measurements of the spacings are recorded in a suitable manner such as on a computer. All measurements that are out of tolerance are of significance in deciding whether to continue operation, or to repair or replace the particular roll rack involved. The several gap shoes 55 (FIG. 4) are disposed across the shoe sections 55A, 55B, and 55C in order to contact all roll segments, whether there are two or three segments for each roll position, as indicated by the five broken lines 92 in FIG. 3.

An example of the manner in which monitor 50 is employed to locate a displacement of a roll is shown in FIG. 7. The monitor 50 is shown disposed between pairs of rolls in the casting line, such as upper rolls 92 and lower rolls 93. Due to shifting of a roll to position 92a, the shoe 55 is inclined at an angle to the housing 54 and the gap sensor 56 is pressed between the rolls 92a and 93 to measure the roll spacing.

In conclusion, the advantage of the roll gap monitor or sled of this invention is that it engages all of the surface of all the roll segments which surfaces are likewise engaged by the workpiece as it moves through the continuous caster. Any surface defect, misalignment, displacement, improperly positioned, or bent roll is discovered by the roll gap monitor. Accordingly, the employment of a shoe that is coextensive with the roll length enables compensation for misaligned rolls and the wide normal profile assures maximum shoe engagement with the roll segments.

What is claimed is:

1. In a continuous casting machine for molten metal of the type having sets of rolls disposed in opposed pairs separated by space gaps and defining a path of travel for a workpiece, each roll including at least two aligned roll segments, the combination of a roll gap monitor for monitoring the gaps between the opposed pairs of rolls, the monitor comprising opposite sides with one opposite side facing the roll segments on one side of the path of travel, and the other opposite side being segmented in accordance with said aligned roll segments but being substantially coextensive with said one opposite side, each segmented other opposite side being independently retractably movably away from said one opposite side toward the other side of the path of travel and against the aligned roll segments on the other side of the path of travel, bias means in the monitor for moving the other opposite sides against an aligned roll segment so as to retain the monitor in place within the path of travel, a gap sensor for each segmented other opposite side supported by the monitor for measuring the space gaps between each opposed pair of roll segments, each gap sensor extending perpendicular to the direction of path of travel of the monitor and including heads mounted for relative movement normal to the direction of moving of the monitor and simultaneously engageable with the corresponding segment of corresponding pairs of rolls successively along the direction of movement and transducer means operatively connected with the heads for transmitting signals representative of the measurements of the gaps of each pair of rolls.

2. The apparatus of claim 1 in which said other opposite side is coextensive with the length of the rolls so as to engage any incongruity on the surfaces of each roll segment.

3. The apparatus of claim 2 in which said one opposite side is comprised of at least two adjacent sections extending side-by-side parallel to the direction of a movement of the sensor.

4. The apparatus of claim 3 in which mounting means mounting the sections on the monitor for limited outward movement in response to the bias means.

5. The apparatus of claim 4 in which the gap sensor extends through opposite sides of said monitor.

6. The apparatus of claim 5 in which the heads include beveled peripheries in the direction of travel so as to facilitate movement of the heads over the surfaces of the rolls.

* * * * *